United States Patent
Zhang

(10) Patent No.: US 10,033,257 B2
(45) Date of Patent: Jul. 24, 2018

(54) LINEAR VIBRATOR

(71) Applicant: Yang Zhang, Shenzhen (CN)

(72) Inventor: Yang Zhang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 456 days.

(21) Appl. No.: 14/789,342

(22) Filed: Jul. 1, 2015

(65) Prior Publication Data
US 2016/0181904 A1    Jun. 23, 2016

(30) Foreign Application Priority Data
Dec. 23, 2014  (CN) .................. 2014 2 0827747 U

(51) Int. Cl.
   *H02K 33/12*        (2006.01)
(52) U.S. Cl.
   CPC .................. *H02K 33/12* (2013.01)
(58) Field of Classification Search
   CPC ....................................................... H02K 33/12
   USPC ....................................................... 310/12–17
   See application file for complete search history.

(56) References Cited

U.S. PATENT DOCUMENTS

| | | | |
|---|---|---|---|
| 6,466,682 B2 | 10/2002 | An | |
| 6,753,628 B1 * | 6/2004 | Neal | G11B 19/2009 29/598 |
| 7,099,489 B2 | 8/2006 | Pan et al. | |
| 7,911,098 B2 * | 3/2011 | Lee | H02K 33/16 310/20 |
| 8,288,898 B2 * | 10/2012 | Jun | H02K 33/16 310/13 |
| 8,624,450 B2 * | 1/2014 | Dong | H02K 33/16 310/15 |
| 8,829,741 B2 * | 9/2014 | Park | B06B 1/045 310/25 |
| 8,878,401 B2 * | 11/2014 | Lee | H02K 33/16 310/15 |
| 2003/0227225 A1 * | 12/2003 | Kaneda | B06B 1/045 310/81 |
| 2005/0062353 A1 * | 3/2005 | Brown | H02K 1/2726 310/156.11 |
| 2008/0309911 A1 * | 12/2008 | Maria De Vos | G03F 7/70725 355/72 |
| 2009/0096299 A1 * | 4/2009 | Ota | B06B 1/045 310/25 |
| 2010/0213773 A1 * | 8/2010 | Dong | H02K 33/16 310/25 |

(Continued)

*Primary Examiner* — Naishadh Desai
(74) *Attorney, Agent, or Firm* — Na Xu; IPro, PLLC

(57) ABSTRACT

A linear vibrator includes a stator having a housing including a receiving space, a moveable unit received in the receiving space, a coil attached to one of the stator and the moveable unit, a magnet assembly attached to the other of the stator and the moveable unit, an elastic member having one end connecting to the moveable unit and another end connecting to the stator for suspending the moveable unit in the receiving space, the elastic member having an elastic gap, and a damping block at least partially received in the elastic gap and deformable by the elastic member during the vibration of the moveable unit within a predetermined vibration amplitude. A boost force is produced by the damping block for accelerating the moveable unit to return to balanced position.

19 Claims, 3 Drawing Sheets

(56) References Cited

U.S. PATENT DOCUMENTS

| | | | |
|---|---|---|---|
| 2011/0089772 A1* | 4/2011 | Dong | H02K 33/16 310/25 |
| 2011/0101797 A1* | 5/2011 | Lee | H02K 33/16 310/29 |
| 2011/0115310 A1* | 5/2011 | Dong | H02K 33/16 310/28 |
| 2011/0115311 A1* | 5/2011 | Dong | H02K 33/16 310/28 |
| 2011/0316361 A1* | 12/2011 | Park | H02K 33/16 310/25 |
| 2013/0209017 A1* | 8/2013 | Schadow | B24B 23/028 384/536 |
| 2014/0196995 A1* | 7/2014 | Walsh | E04B 1/98 188/266.2 |

* cited by examiner

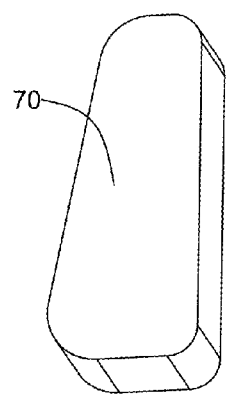
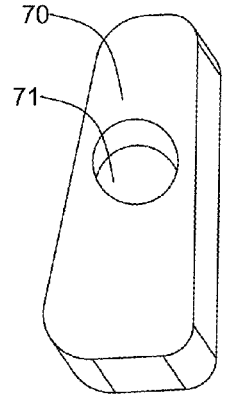
Fig. 3a　　　　Fig. 3b
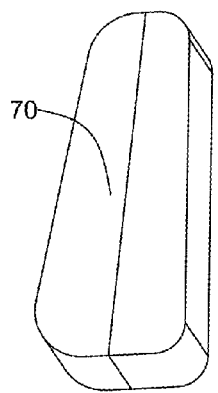
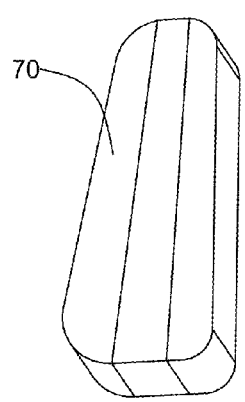
Fig. 4a　　　　Fig. 4b
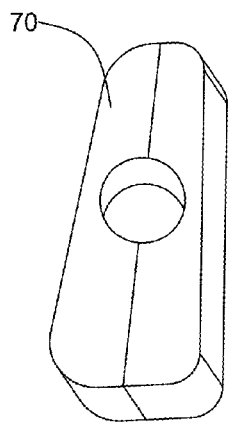
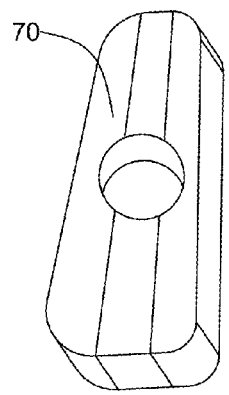
Fig. 5a　　　　Fig. 5b

LINEAR VIBRATOR

FIELD OF THE INVENTION

The present invention relates to vibrators for generating tactile vibrations, more particularly to a linear vibrator used in a portable consumer electronic device.

DESCRIPTION OF RELATED ART

Consumer products, such as mobile phones and portable multi-media players, generally include vibrators for generating tactile feedback. For example, a mobile phone has a vibrator for generating vibration while a call is called in, and a portable multi-media player has a touch screen having vibrators for getting tactile feedback.

A vibrator has a moving unit moving along a linear direction is called linear vibrator. Linear vibrators are widely used in consumer products and are disclosed in U.S. Pat. No. 6,466,682 B2 issued on Oct. 15, 2002, and U.S. Pat. No. 7,099,489 B2 issued on Aug. 29, 2006. The vibrator is mounted on a mounting surface of a printed circuit board, and the moving unit thereof is actuated to move along a direction perpendicular to the mounting surface. Another linear vibrator includes a moveable unit suspended by a plurality of elastic members for being movable along a direction parallel to a mounting surface of a printed circuit board from which vibration signals are transmitted.

While working, the vibrator needs to be provided with sufficient driving force to drive the movable unit to generate strong vibrations. Greater driving force makes the moveable unit cost more time to return to balanced position. Further, exceeding driving force would drive the moveable unit to strike the housing of the vibrator thereby causing noises.

For avoiding the noises caused by the exceeding amplitude of the moveable unit, a block made of soft material is arranged on the housing or on the moveable unit. When the moveable unit moves beyond the predetermined amplitude, even if the moveable unit strikes the housing, noises could not be produced by virtue of the soft block. However, the related vibrator still has the problem that the moveable unit needs more time to return to balanced position.

Accordingly, an improved linear vibrator capable of avoiding striking noises and shortening return time is desired.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

FIG. 3a is an isometric view of a first form of a damping block of the linear vibrator.

FIG. 3b is an isometric form of a second form of the damping block.

FIG. 4a is an isometric view of a third form of the damping block.

FIG. 4b is an isometric view of a fourth form of the damping block.

FIG. 5a is an isometric view of a fifth form of the damping block.

FIG. 5b is an isometric view of a sixth form of the damping block.

DETAILED DESCRIPTION OF THE EXEMPLARY EMBODIMENT

The present invention will hereinafter be described in detail with reference to an exemplary embodiment.

Figure 1:
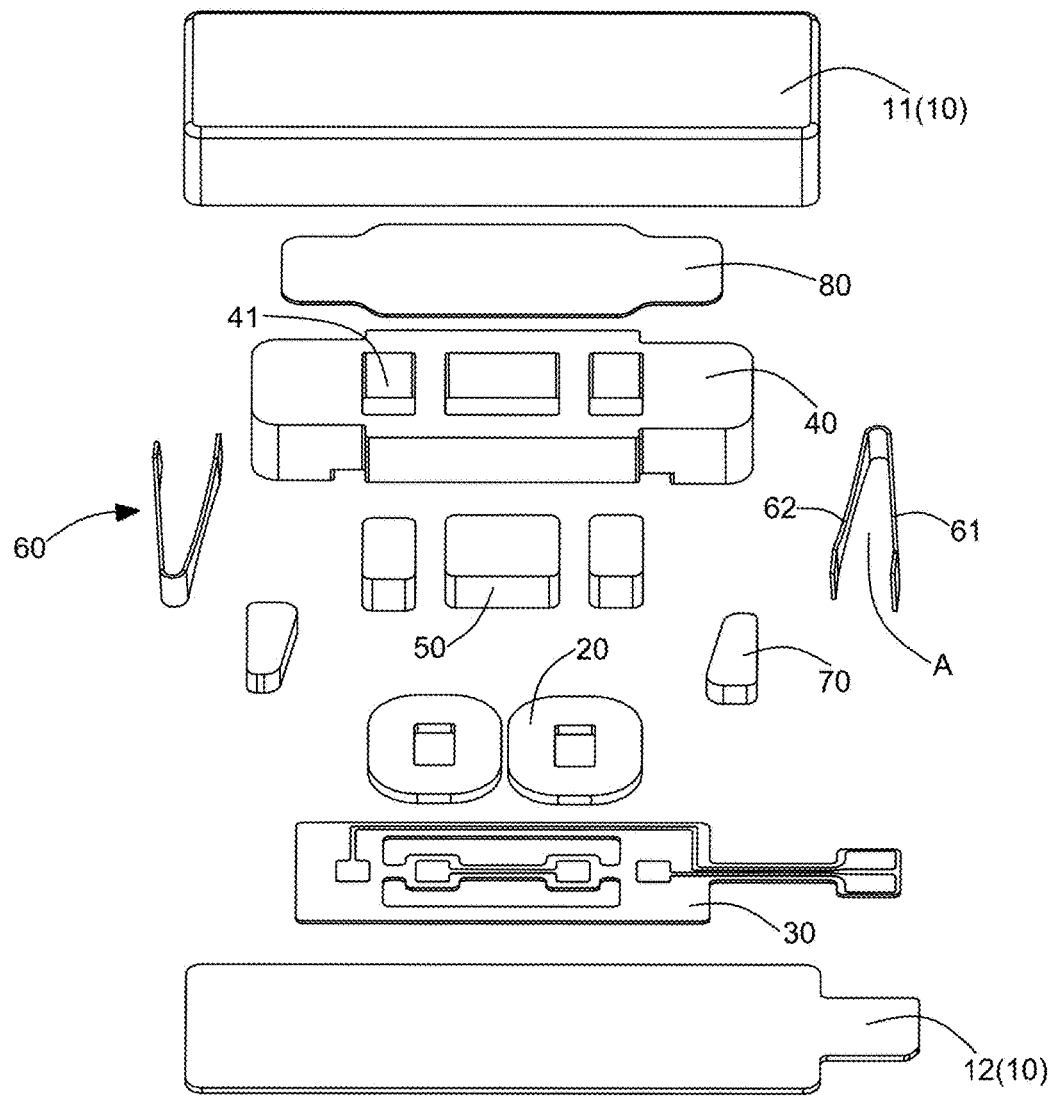
FIG. 1 is an isometric and exploded view of a linear vibrator in accordance with an exemplary embodiment of the present disclosure.
Figure 2:
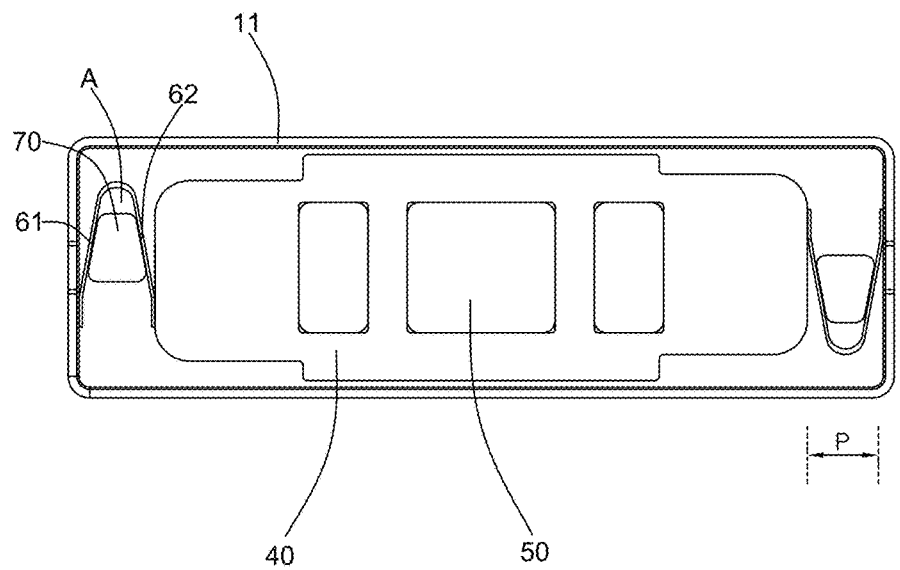
FIG. 2 is a top view of the linear vibrator in FIG. 1, wherein a housing thereof has been removed.

Referring to FIGS. 1-2, a linear vibrator 100 in accordance with an exemplary embodiment of the present disclosure includes a housing 10 providing an accommodating space therein, and a coil 20 received in the accommodating space. The housing 10 comprises a cover 11 and a base 12 engaging with the cover 11. The coil 20 is positioned on the base 12. The vibrator 100 further includes a circuit board 30 attached to the base 12 for providing the coil 20 with driving signals. Here, the housing 10, the coil 20, and the circuit board 30 cooperatively form a stator of the vibrator. Be noted that the stator may include other components as long as the components are relatively fixed.

The linear vibrator 100 further includes a weight 40 having a receiving hole 41, a magnet assembly 50 received in the receiving hole 41, a pole plate 80 attached to the weight 40, and a plurality of elastic members 60 suspending the weight 40 in the accommodating space of the housing 10. The magnet assembly 50 is disposed above the coil 20 and keeps a distance from the coil 20. The magnet assembly 50 may comprise one or more magnets. Here, the weight 40, the magnet assembly 50, and the pole plate 80 cooperatively form a moveable unit (rotor) of the linear vibrator 100. In fact, the moveable unit may comprise other components as long as the other components are moveable with respect to the stator. Alternatively, the coil 20 could be mounted in the receiving hole of the weight, and the magnet assembly could be mounted on the base 12.

The elastic member 60 includes an elastic gap A enabling the elastic member to deform elastically. Correspondingly, the linear vibrator 100 further includes a damping block 70 at least partially accommodated in the elastic gap A. The damping block 70 is capable of being pressed by the elastic member 60 and being deformable elastically in the elastic gap. The linear vibrator 100 is provided with a predetermined vibration amplitude P that is designed by actual requirements and is determined by the electro-magnetic force generated by the coil and the magnet assembly. Once the linear vibrator is manufactured, the predetermined vibration amplitude is determined. If the coil is provided with exceeding current, the amplitude of the moveable unit must be beyond the predetermined vibration amplitude. Or, if the linear vibrator falls, the moveable unit would also move beyond the predetermined vibration amplitude. It is understood that the predetermined vibration amplitude ensures that the moveable unit can't strike the housing. The damping block 70 is forced to be deformable elastically by the elastic member 60 within the predetermined vibration amplitude.

The elastic member 60 includes a first arm 61, and a second arm connected to the first arm. The elastic gap A is formed by the first and second arms 61, 62. One end of the first arm 61 is fixed to the stator, and one end of the second arm 62 is fixed to the moveable unit thereby suspending the moveable unit in the accommodating space. The damping block 70 is capable of being pressed by the first arm 61, the second arm 62, or by the first and second arms. That is, the damping arm can be fixed on the first arm, or on the second arm, or sandwiched by the first and second arms.

Figure 2A:
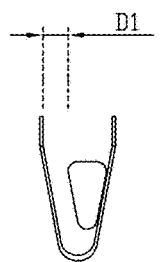
FIGS. 2a~2c are illustrations of variable arrangements of a damping block and an elastic member of the linear vibrator.

The damping block 70 could be attached to the first arm 61, and keeps a distance from the second arm 62, wherein the distance between the damping block 70 and the second arm 62 is smaller than the predetermined vibration amplitude. As shown in FIG. 2a, the damping block 70 is attached to the first arm 61 and forms a distance D1 from the second arm 62. The distance D1 is smaller than the predetermined vibration amplitude P.

Figure 2B:
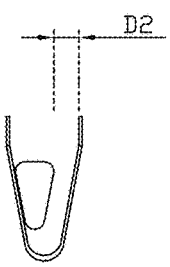

The damping block 70 could be also attached to the second arm 62, and keeps a distance from the first arm 61, wherein the distance between the damping block 70 and the first arm 61 is smaller than the predetermined vibration amplitude. As shown in FIG. 2b, the damping block 70 is attached to the second arm 62 and forms a distance D2 from the first arm 61. The distance D2 is smaller than the predetermined vibration amplitude P.

Alternatively, referring to FIG. 2, the damping block 70 could be attached to the first arm 61 and the second arm 62, i.e. sandwiched between the first and second arms. In this case, once the moveable unit moves, the damping block will be pressed and deform elastically.

Figure 2C:
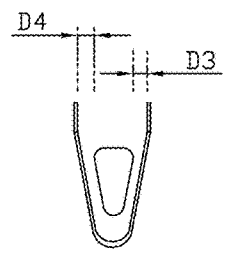

Referring to FIG. 2c, the damping block 70 could be fixed on the housing, and keeps a first distance D3 from the first arm 61, and a second distance D4 from the second arm 62. The summation of the first and second distances is smaller than the predetermined vibration amplitude P.

The damping block 70 can be designed according to actual requirements and may have variable forms or shapes. For example, as shown in FIG. 3a, the damping block 70 is a solid structure having a shape corresponding to the elastic gap. As shown in FIG. 3b, the damping block 70 is similar to the one in FIG. 3a but further includes a though hole 71 therein for adjusting the damping performance. As shown in FIG. 4a, the damping block 70 could be made of two different materials having different stiffness, and as shown in FIG. 4b, the damping block 70 is made of three different materials having different stiffness. Also, the damping block 70 in FIG. 5a is similar to the one in FIG. 4a but further includes a through hole therein. And the damping block 70 in FIG. 5b defines a through hole based on the structure in FIG. 4b. Different materials to form the damping block is used to adjust the damping performance thereof.

The damping block used in the linear vibrator elastically deforms during the vibration of the moveable unit within the predetermined vibration amplitude, by the pressing from the first elastic arm or the second elastic arm of the elastic member. During the vibration, the damping block is pressed and released repeatedly for generating damping performance. Further, while the damping block is pressed or released, a boost force is produced by the damping block for accelerating the moveable unit to return to balanced position. Even if the moveable unit exceeds the predetermined vibration amplitude, the damping block will also serve as a limitation or cushion for avoiding striking noises.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A linear vibrator, comprising:
a stator having a housing including a receiving space;
a moveable unit received in the receiving space;
a coil attached to one of the stator and the moveable unit;
a magnet assembly attached to the other of the stator and the moveable unit;
an elastic member having one end connecting to the moveable unit and another end connecting to the stator for suspending the moveable unit in the receiving space, the elastic member having an elastic gap;
a damping block at least partially received in the elastic gap and deformable by the elastic member during the vibration of the moveable unit within a predetermined vibration amplitude.

2. The linear vibrator as described in claim 1, wherein the damping block is solid.

3. The linear vibrator as described in claim 1, wherein the damping block has a through hole therein for adjusting the damping performance.

4. The linear vibrator as described in claim 1, wherein the damping block is made of different materials having different stiffness.

5. The linear vibrator as described in claim 1, wherein the elastic member includes a first arm connecting to the housing, and a second arm connected to the first arm and connecting to the moveable unit, and the elastic gap is formed between the first and second arms.

6. The linear vibrator as described in claim 5, wherein the damping block is sandwiched between the first and second arms.

7. The linear vibrator as described in claim 5, wherein the damping block is attached to the first arm and keeps a distance from the second arm, the distance between the damping block and the second arm is smaller than the predetermined vibration amplitude.

8. The linear vibrator as described in claim 5, wherein the damping block is attached to the second arm and keeps a distance from the first arm, the distance between the damping block and the first arm is smaller than the predetermined vibration amplitude.

9. The linear vibrator as described in claim 5, wherein the damping block is fixed to the stator, keeping a first distance from the first arm and a second distance from the second arm, a summation of the first distance and the second distance is smaller than the predetermined vibration amplitude.

10. A linear vibrator, comprising:
a stator;
a moveable unit being moveable relative to the stator within a predetermined vibration amplitude;
an elastic member for supporting the moveable unit and providing the moveable unit with elastic forces to vibrate repeatedly, the elastic member further including an elastic gap;
a damping block at least partially accommodated in the elastic gap, and deformable elastically corresponding to an elastic deformation of the elastic member during the vibration of the moveable unit within the predetermined vibration amplitude.

11. The linear vibrator as described in claim 10, wherein the damping block has a through hole therein for adjusting the damping performance.

12. The linear vibrator as described in claim 10, wherein the damping block is made of different materials having different stiffness.

13. The linear vibrator as described in claim 10, wherein the elastic member includes a first arm connecting to the housing, and a second arm connected to the first arm and connecting to the moveable unit, and the elastic gap is formed between the first and second arms.

14. The linear vibrator as described in claim 13, wherein the damping block is sandwiched between the first and second arms.

15. The linear vibrator as described in claim 13, wherein the damping block is attached to the first arm and keeps a distance from the second arm, the distance between the damping block and the second arm is smaller than the predetermined vibration amplitude.

16. The linear vibrator as described in claim 13, wherein the damping block is attached to the second arm and keeps a distance from the first arm, the distance between the damping block and the first arm is smaller than the predetermined vibration amplitude.

17. The linear vibrator as described in claim 13, wherein the damping block is fixed to the stator, keeping a first distance from the first arm and a second distance from the second arm, a summation of the first distance and the second distance is smaller than the predetermined vibration amplitude.

18. The linear vibrator as described in claim 1, wherein the damping block is made of different materials having different stiffness and has a through hole therein for adjusting the damping performance, the through hole passes through at least two different materials.

19. The linear vibrator as described in claim 10, wherein the damping block is made of different materials having different stiffness and has a through hole therein for adjusting the damping performance, the through hole passes through at least two different materials.

* * * * *